United States Patent
Hernandez Cervantes et al.

(10) Patent No.: US 10,099,567 B2
(45) Date of Patent: Oct. 16, 2018

(54) VEHICLE AUXILIARY BATTERY CHARGING SYSTEM

(71) Applicant: Ford Global Technologies, LLC, Dearborn, MI (US)

(72) Inventors: Oscar Hernandez Cervantes, Naucalpan de Juarez (MX); Antonio Espiritu Santo Rincon, Atizapan de Zaragoza (MX); Luis Antonio Ocegueda Perez, Ecatepec de Morelos (MX); Rodrigo Del Moral Diaz, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 14/875,198

(22) Filed: Oct. 5, 2015

(65) Prior Publication Data
US 2017/0096076 A1   Apr. 6, 2017

(51) Int. Cl.
*H02J 7/00* (2006.01)
*H02J 7/14* (2006.01)
(Continued)

(52) U.S. Cl.
CPC ......... *B60L 11/1838* (2013.01); *B60L 11/187* (2013.01); *B60L 11/1861* (2013.01);
(Continued)

(58) Field of Classification Search
USPC ....... 320/103, 136, 116, 132, 155, 162, 164, 320/107, 109, 104, 134, 126, 150, 101,
(Continued)

(56) References Cited

U.S. PATENT DOCUMENTS

| 4,983,904 | A | 1/1991 | Iwahashi |
| 6,158,537 | A | 12/2000 | Nonobe |

(Continued)

FOREIGN PATENT DOCUMENTS

| EP | 2472278 A1 | 7/2012 |
| EP | 2645467 A1 | 10/2013 |

(Continued)

OTHER PUBLICATIONS

Search Report dated Mar. 13, 2017 for GB Patent Application No. GB1616724.9.

(Continued)

*Primary Examiner* — Alexis Pacheco
(74) *Attorney, Agent, or Firm* — James P. Muraff; Neal, Gerber & Eisenberg LLP

(57) ABSTRACT

Various embodiments of the present disclosure provide an auxiliary battery charging system for monitoring and regulating the energy flow to an auxiliary battery in a vehicle. More specifically, the auxiliary battery charging system of the present disclosure includes a monitoring controller configured to operate with a plurality of sensors, a display device and a battery charger to display the battery status (such as temperature, voltage, time of last charge); initiate charging of the auxiliary battery when the auxiliary battery voltage reaches a predetermined minimum voltage; and disable the charging process when the auxiliary battery voltage has reached an optimum level.

20 Claims, 4 Drawing Sheets

(51) Int. Cl.
*B60L 11/18* (2006.01)
*H02J 7/04* (2006.01)

(52) U.S. Cl.
CPC ............ *H02J 7/007* (2013.01); *H02J 7/0047* (2013.01); *H02J 7/045* (2013.01); *H02J 7/1492* (2013.01); *H02J 2007/005* (2013.01)

(58) Field of Classification Search
USPC ........ 320/108, 111, 112, 125, 129, 137, 148, 320/152; 324/426, 430
See application file for complete search history.

(56) References Cited

U.S. PATENT DOCUMENTS

| | | | |
|---|---|---|---|
| 6,833,784 | B1 | 12/2004 | Ishii et al. |
| 8,760,306 | B2 | 6/2014 | Chandler et al. |
| 2003/0197484 | A1* | 10/2003 | Kotlow ................ H02J 7/1461 320/104 |
| 2005/0225289 | A1 | 10/2005 | Iida et al. |
| 2006/0006876 | A1 | 1/2006 | Bertness |
| 2009/0184686 | A1 | 7/2009 | Owens et al. |
| 2009/0195217 | A1* | 8/2009 | Choi ........................ B60K 6/28 320/152 |
| 2009/0295331 | A1 | 12/2009 | Kao |
| 2010/0230193 | A1 | 9/2010 | Grider et al. |
| 2010/0244782 | A1 | 9/2010 | Nagayama et al. |
| 2012/0101755 | A1 | 4/2012 | Hirasawa |
| 2015/0066837 | A1 | 3/2015 | Twarog et al. |
| 2015/0162771 | A1 | 6/2015 | Monden et al. |

FOREIGN PATENT DOCUMENTS

| | | |
|---|---|---|
| GB | 2510821 A | 8/2014 |
| WO | WO 2015063945 A1 | 5/2015 |

OTHER PUBLICATIONS

M. Brandl et al., Batteries and Battery Management Systems for Electric Vehicles, Dec. 12, 2011.

* cited by examiner

VEHICLE AUXILIARY BATTERY CHARGING SYSTEM

TECHNICAL FIELD

The present disclosure generally relates to an auxiliary battery charging system. More particularly, the auxiliary battery charging system is configured to monitor the voltage of a vehicle auxiliary battery and automatically charge the auxiliary battery to prevent the auxiliary battery from dropping below a predetermined voltage.

BACKGROUND

A typical vehicle includes a main vehicle battery system with a vehicle battery charging and discharging processes. The main vehicle battery powers the major systems of the vehicle. Many vehicles also include a separate auxiliary battery system to power the smaller instrumentation and electronic systems of the vehicle such as entertainment systems and audio devices. Both battery systems have a great impact on the performance and cost of operating a vehicle. For example, auxiliary batteries are used during testing with the objective of isolating the vehicle's electrical system from the testing equipment charge demand. In other words, it avoids these systems to increase the electrical load from the alternator. Accordingly, efficient utilization and management of the battery system is vital.

A major issue for effective battery management systems is preventing overcharge and deep discharge of the batteries as this may damage the batteries, shorten their lifetime or potentially damage components of the vehicle. Thus, it is desirable to provide a battery management system to maintain battery systems within a safe and reliable operating range. However, most vehicles do not provide any system to protect their batteries from deep discharge cycles.

Typical chargers for vehicle auxiliary batteries are charging devices placed in the trunk of the vehicle, which activate the auxiliary charge process periodically. When such auxiliary battery charging devices are turned off, such devices are not activating any kind of charge process for the auxiliary battery and the auxiliary battery is at risk of being drained completely after a short period of time. For example, this occurs most often when a user leaves all of the equipment in the vehicle on after turning the vehicle off. This represents an economical cost to the vehicle user as it may require a replacement auxiliary battery. Additionally, the spike in electrical current that could result from turning on the vehicle while using the auxiliary battery could cause the auxiliary battery and/or the testing equipment of the vehicle to overheat or be damaged.

In existing vehicle battery systems, the auxiliary battery is charged by the main vehicle battery or by external chargers. However, in such systems, in the case that the main vehicle battery malfunctions, the draw of current through the auxiliary battery system to power the entire vehicle is enough to damage the smaller electrical components ordinarily powered by the auxiliary battery. Furthermore, charging systems and methods vary depending on the source's voltage, amperage and the desired charging time. Thus, such systems must provide the battery with enough energy to complete a full charge without overheating it.

There is a need for new systems that solve these problems.

SUMMARY

Various embodiments of the present disclosure provide an auxiliary battery charging system for monitoring and regulating the energy flow to an auxiliary battery in a vehicle. More specifically, the auxiliary battery charging system of the present disclosure includes a monitoring controller configured to operate with a plurality of sensors, a display device and a battery charger to: (1) display the battery status (such as temperature, voltage, time of last charge); (2) initiate charging of the auxiliary battery when the auxiliary battery voltage reaches a predetermined minimum voltage; and (3) disable the charging process when the auxiliary battery voltage has reached an optimum level. In certain embodiments, the auxiliary battery charging system of the present disclosure automatically initiates and stops the recharging process so that the user can be assured that the auxiliary battery will remain within a working range at all times and prevent permanent damage to the auxiliary battery. As such, the auxiliary battery charging system of the present disclosure takes advantage of the vehicle's charging system (i.e., an alternator) during normal operation. In one embodiment, the auxiliary battery charging system of the present disclosure is configured to operate with a 127 AC-12 VDC adapter to charge the auxiliary battery while the vehicle is off. Such a configuration is designed to protect the auxiliary battery from the effects the vehicle's electrical load or by users misuse.

In certain embodiments, the auxiliary battery charging system of the present disclosure enables a user to modify the working parameters of the charging and recharging process. More specifically, the user may modify parameters such as the minimum voltage, the charge time, duration between recharging, and the optimum voltage level to which the auxiliary battery is charged. In one embodiment, an example optimum charge is from 13.5 V to 15 V and the maximum voltage is 15.6 V as long as the battery temperature remains below 51° C. In this example embodiment, the minimum voltage for mandatory recharge is set at 10.5 V±0.5 V, which is the range the user can modify. Such a configuration enables the user to set the parameters for the auxiliary battery charging system based on different environmental constraints.

In another embodiment, the auxiliary battery charging system of the present disclosure prevents current flow throughout vehicle. More specifically, when the main vehicular battery is damaged (such as having low voltage or no charge retention), current flows from the auxiliary battery to the vehicle. If this occurs, the current draw to power the vehicle would flow through the smaller systems that the auxiliary battery typically powers. Such current flow through these systems would be too high and would damage the instrumentation and electronic equipment ordinarily powered by the auxiliary battery and this could make the voltage to drop below the test equipment operating range. The auxiliary battery charging system of the present disclosure prevents such damage by continuously monitoring the battery and by controlling the charge and recharge process.

BRIEF DESCRIPTION OF THE DRAWINGS

For a better understanding of the invention, reference may be made to embodiments shown in the following drawings. The components in the drawings are not necessarily to scale and related elements may be omitted to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION OF EXAMPLE EMBODIMENTS

Figure 1:
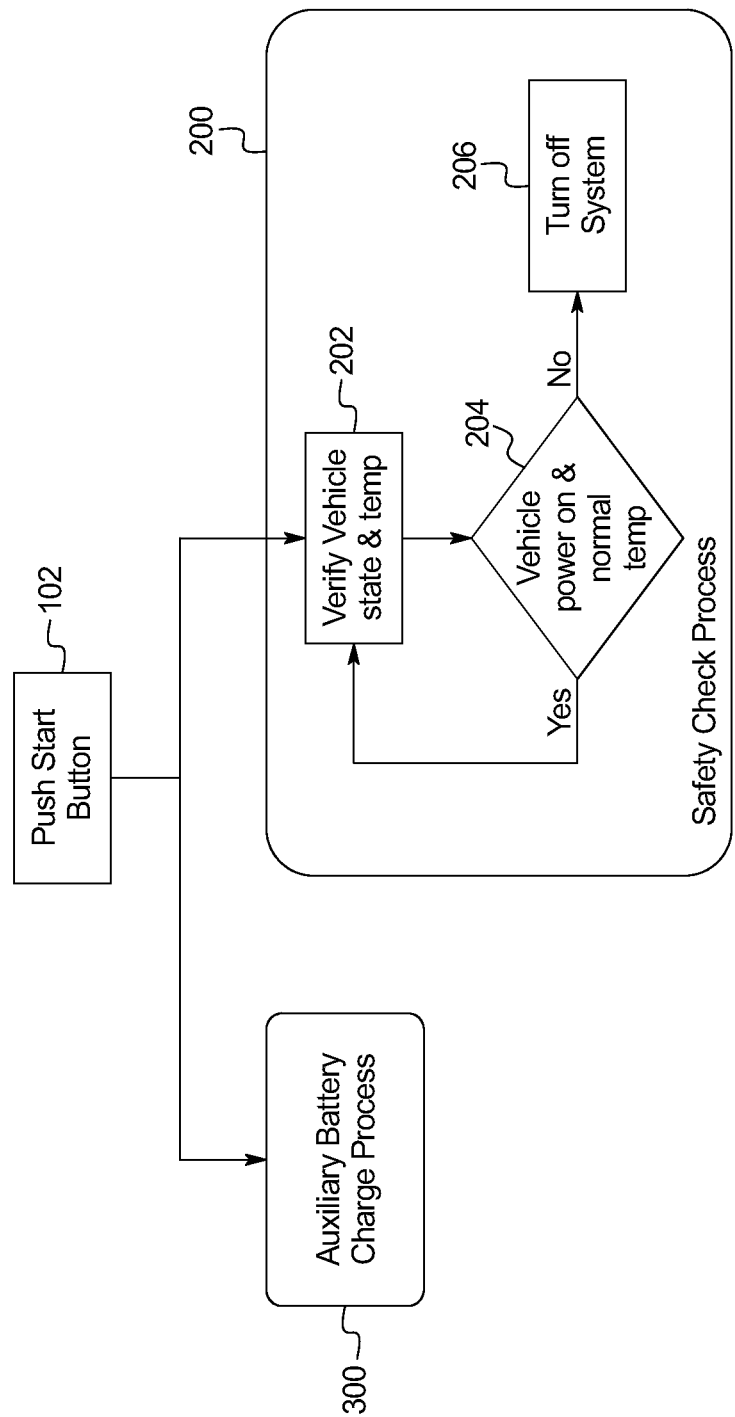
FIG. 1 is a flowchart illustrating a process for operating an auxiliary battery charging system of the present disclosure.

While the auxiliary battery charging system and method of the present disclosure may be embodied in various forms, there are shown in the drawings, and will hereinafter be described, some exemplary and non-limiting embodiments of the auxiliary battery charging system and method. The present disclosure is to be considered an exemplification of the auxiliary battery charging system and method and is not intended to limit the system and method to the specific embodiments illustrated and described herein. Not all of the depicted components described in this disclosure may be required, however, and some embodiments may include additional, different, or fewer components from those expressly described herein. Variations in the arrangement and type of the components may be made without departing from the spirit or scope of the claims set forth herein Various embodiments of the present disclosure provide an auxiliary battery charging system for monitoring and regulating the energy flow to an auxiliary battery in a vehicle. More specifically, the auxiliary battery charging system of the present disclosure includes a monitoring controller configured to operate with a plurality of sensors, a display device and a battery charger to: (1) display the battery status (such as temperature, voltage, time of last charge); (2) initiate charging of the auxiliary battery when the auxiliary battery voltage reaches a predetermined minimum voltage; and (3) disable the charging process when the auxiliary battery voltage has reached an optimum level. In certain embodiments, the auxiliary battery charging system of the present disclosure automatically initiates and stops the recharging process so that the user can be assured that the auxiliary battery will remain within a working range at all times and prevent permanent damage to the auxiliary battery. As such, the auxiliary battery charging system of the present disclosure takes advantage of the vehicle's charging system (i.e., an alternator) during normal operation. In one embodiment, the auxiliary battery charging system of the present disclosure is configured to operate with a 127 AC-12 VDC adapter to charge the auxiliary battery while the vehicle is off. Such a configuration is designed to protect the auxiliary battery from the effects the vehicle's electrical load or by users misuse.

The components of the auxiliary battery charging system of the present disclosure (described in detail below) may be included on, within, or otherwise integrated with a vehicle. One or more of the components of the auxiliary battery charging system may be shared with one or more components of existing vehicle systems.

The auxiliary battery charging system may be included in or otherwise usable with any suitable vehicle, such as (but not limited to): (1) a non-commercial passenger vehicle such as a sedan or a truck; (2) a commercial vehicle such as a tractor-trailer; or (3) a non-civilian vehicle such as a vehicle used by a law enforcement agency, a government agency, an emergency response agency (e.g., a fire response agency), or a medical response agency (e.g., a hospital). This list is not exhaustive, and is provided for exemplary purposes only.

The features, processes, and methods described herein with respect to the capabilities of the auxiliary battery charging system may be implemented by a vehicle control tool running on the auxiliary battery charging system. The vehicle control tool may be a program, application, and/or combination of software and hardware that is incorporated on one or more of the components that comprise the auxiliary battery charging system. The vehicle control tool and the auxiliary battery charging system are described in more detail below (and collectively referred to as the auxiliary battery charging system for brevity).

Figure 2:
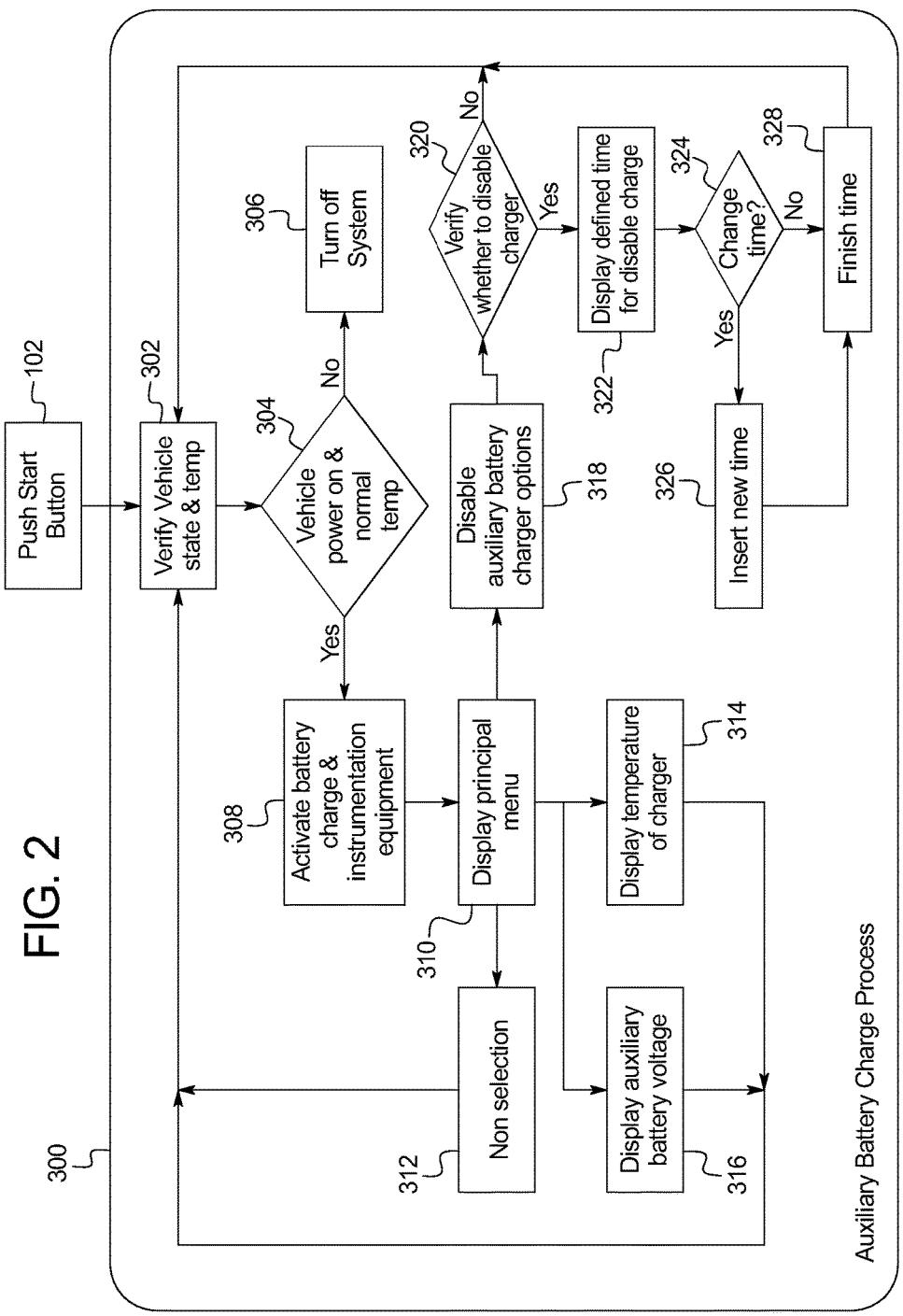
FIG. 2 is a flowchart illustrating a process for operating an auxiliary battery charging system of the present disclosure.

FIGS. 1 and 2 are flowcharts of example processes or methods of operating an auxiliary battery charging system. FIG. 1 depicts an example process 100 of operating an auxiliary battery charging system by utilizing two sub-processes: an auxiliary battery charging process 300 and a safety check process 200. FIG. 2 depicts an example of the auxiliary battery charging process 300 of the present disclosure in greater detail.

In various embodiments, the processes are represented by a set of instructions stored in one or more memories and executed by one or more processors. Although the processes are described with reference to the flowcharts shown in FIGS. 1 and 2, many other processes of performing the acts associated with these illustrated processes may be employed. For example, the order of certain of the illustrated blocks and/or diamonds may be changed, certain of the illustrated blocks and/or diamonds may be optional, and/or certain of the illustrated blocks and/or diamonds may not be employed.

Turning to FIG. 1, in one example embodiment, the process 100 for operating the auxiliary battery charging system of the present disclosure is initiated by a user pushing a start button, as indicated by block 102. In this example embodiment, a user manually turns on the auxiliary battery charging system from a start button. In other embodiments, the auxiliary battery charging system may be set to turn on automatically when the vehicle door opens.

After pushing the start button, as illustrated by FIG. 1, two processes are initiated. These processes are the auxiliary battery charging process 300 (further described in FIG. 2) and the safety check process 200.

The safety check process 200 is an ongoing repeating process that continues as long as the auxiliary battery charging system is on. This is to provide ongoing monitoring of the auxiliary battery and the auxiliary battery charger so that the auxiliary battery charging system may be shut down if necessary for safety concerns. The safety check process 200 includes verifying vehicle state and the ambient temperature surrounding the auxiliary battery and the auxiliary battery charger, as indicated by block 202. After verifying the battery and charger temperature, the safety check process 200 includes determining whether vehicle power is on and whether the temperature is within a normal range, as indicated by decision diamond 204. In one example embodiment, the normal temperature range is −31° C. at full charge, up to 51° C. and the lower temperature limit depends on the battery voltage. For example, having the battery at 90% charge could imply that the minimum temperature should be around −27° C.

If the auxiliary battery charging system determines that the vehicle power is on and the vehicle temperature is within the normal range, the safety check process 200 includes returning to block 202 and continuing to monitor vehicle state and temperature.

If, on the other hand, the vehicle power is on and the temperature is not within a normal range, the safety check process 200 includes turning the auxiliary battery charging system off as indicated by block 206. Such a configuration provides an automatic shut off of the charging system to prevent overheating and protect the auxiliary battery from permanent damage.

Turning to FIG. 2, in this embodiment, the auxiliary battery charging process 300 includes also begins by a user pushing a start button, as indicated by block 102. As described above with respect to the safety check process 200, in this example embodiment, a user manually turns on the auxiliary battery charging system from a start button. In other embodiments, the auxiliary battery charging system may be set to turn on automatically when the vehicle door opens thereby initiating the auxiliary battery charging process 300. After a user pushes the start button, the auxiliary battery charging process 300 includes verifying vehicle state and temperature, as indicated by block 302. As discussed above, this verification is a safety check for the auxiliary battery, the charging system and the vehicle functionality.

After verifying the vehicle state and temperature, the auxiliary battery charging process 300 includes determining whether the vehicle power is on and whether the temperature of the auxiliary battery is within a normal range, as indicated by decision diamond 304. If the auxiliary battery charging system determines that temperature is not within the normal range, the process 300 includes turning the auxiliary battery charging system off as indicated by block 306.

On the other hand, if the auxiliary battery charging system determines that the vehicle power is on and the temperature is within the normal temperature range, the auxiliary battery charging process 300 includes activating battery charge and instrumentation equipment, as indicated by block 308. More specifically, in this example embodiment activating battery charge and instrumentation equipment enables the auxiliary battery charging system of the present disclosure to supply energy to the instrumentation/test equipment. The instrumentation equipment includes, but is not limited to, testing hardware, entertainment systems or any other electronic device that is plugged to the vehicle.

After activating the battery charge and instrumentation equipment, the auxiliary battery charging process 300 includes displaying a principal menu, as indicated by block 310. In one embodiment, the display device is a human to machine interface (HMI). In one embodiment, the principal menu displays information such as, but not limited to, the time of the last charging, the current voltage, the temperature, time to disable charge, other charging options, or options to leave the charging independent from the main battery (i.e., place the auxiliary battery in sleep mode, which is described in greater detail below).

As described in greater detail below, in various embodiments, the principal menu is displayed on a display device such as an HMI. The display device is capable of receiving inputs from a user such as through a touch screen or buttons.

In this example embodiment, after displaying the principal menu, the auxiliary battery charging process 300 includes multiple options for the user to select from the principal menu. For example, in this embodiment, if the user makes no selection, as indicated by block 312, the auxiliary battery charging process 300 includes returning to block 302 to continue to verify vehicle state and temperature.

On the other hand, the user may make one of several selections from the principal menu. For example, if the user selects "Display Auxiliary Battery Voltage," as indicated by block 316, the auxiliary battery charging process 300 includes displaying the current voltage of the auxiliary battery. After displaying the auxiliary battery voltage, the auxiliary battery charging process 300 includes returning to block 302 to continue to verify vehicle state and temperature.

If the user selects "Display Temperature of Charger," off of the principal menu, as indicated by block 314, the auxiliary battery charging process 300 includes displaying the temperature of the auxiliary battery charger, as indicated by block 314. After displaying the temperature of the auxiliary battery charger, the auxiliary battery charging process 300 includes returning to block 302 to continue to verify vehicle state and temperature.

If the user selects an option to "Disable the Auxiliary Battery Charger Options" off of the principal menu, as indicated by block 318, the auxiliary battery charging process 300 includes prompting the user again to verify that the user intended to make this selection, as indicated by decision diamond 320. If the user selects "NO," indicating that the user did not intend to disable the auxiliary battery charger, the auxiliary battery charging process 300 includes returning to block 302 to continue to verify vehicle state and temperature.

If the user selects "YES," indicating that the user did intend to disable the auxiliary battery charger, the auxiliary battery charging process 300 includes displaying to the user the defined time for disabling the charge, as indicated by block 322. This defined time is the period of time after which the system will disable the charge to the auxiliary battery. After displaying the defined time for disabling the charge, the auxiliary battery charging process 300 includes prompting the user to determine whether the user would like to change the displayed defined time, as indicated by decision diamond 324. Thus, if the user wishes to disable the charge to the auxiliary battery immediately rather than after the displayed period of time, the user may do so by selecting to change the time.

If the user indicates that the user wishes to change the charge time, the auxiliary battery charging process 300 enables the user to insert a new time, as indicated by block 326. In certain embodiments, the system enables the user to change the time through various inputs on the HMI.

If, on the other hand, the user does not wish to change the time, the auxiliary battery charging process 300 includes completing the charge time, as indicated by block 328. The auxiliary battery charging process 300 then includes returning to block 302 to continue to verify vehicle state and temperature.

It should be appreciated that in certain embodiments, the auxiliary battery charging system enables the user to manually initiate and stop the recharging process. In certain embodiments, the auxiliary battery charging system of the present disclosure automatically initiates and stops the recharging process so that the user can be assured that the auxiliary battery will remain within a working range at all times. Such a configuration prevents permanent damage to the auxiliary battery. In certain embodiments, the auxiliary battery charging system of the present disclosure enables a user to modify the working parameters of the charging and recharging process such that the user may modify parameters such as the minimum voltage, the charge time, duration between recharging, and the optimum voltage level to which the auxiliary battery is charged.

In another embodiment, the auxiliary battery charging system of the present disclosure prevents current flow throughout vehicle. More specifically, when the main vehicular battery is damaged, current flows from the auxiliary battery to the vehicle. If this occurs, the current draw to power the vehicle would flow through the smaller systems that the auxiliary battery typically powers. It should be appreciated that the typical engine crank is between 80 and 180 amperes. Such current flow through these systems would be too high and would damage the instrumentation and electronic equipment ordinarily powered by the auxiliary battery.

In one embodiment, the auxiliary battery charger options are disabled to place the auxiliary battery in sleep mode. More specifically, in certain embodiments, even after the vehicle is turned off, various systems within the vehicle are still functions to collect and record data. The auxiliary battery powers these systems. The auxiliary battery charging system of the present disclosure enables a user to specify a period of time to keep the auxiliary battery charging system on, so that the auxiliary battery remains charged. After the period of time has elapsed, the auxiliary battery charging system turns off, and the battery is no longer charged. This prevents the battery from becoming overcharged while the vehicle is off while still permitting the battery to power a few electronic systems after the vehicle has been turned off. This is referred to hereinafter as sleep mode. It should be appreciated that the parameters for sleep mode are modifiable by the user depending on the particular environment or use. Through such a configuration, the auxiliary battery charging system of the present disclosure ensures the auxiliary battery maintains a minimum voltage and prevents overcharging the battery. By maintaining at least a minimal voltage of the auxiliary battery, the auxiliary battery can continue to power these instruments and increase the time that the vehicular system can function.

Figure 3:
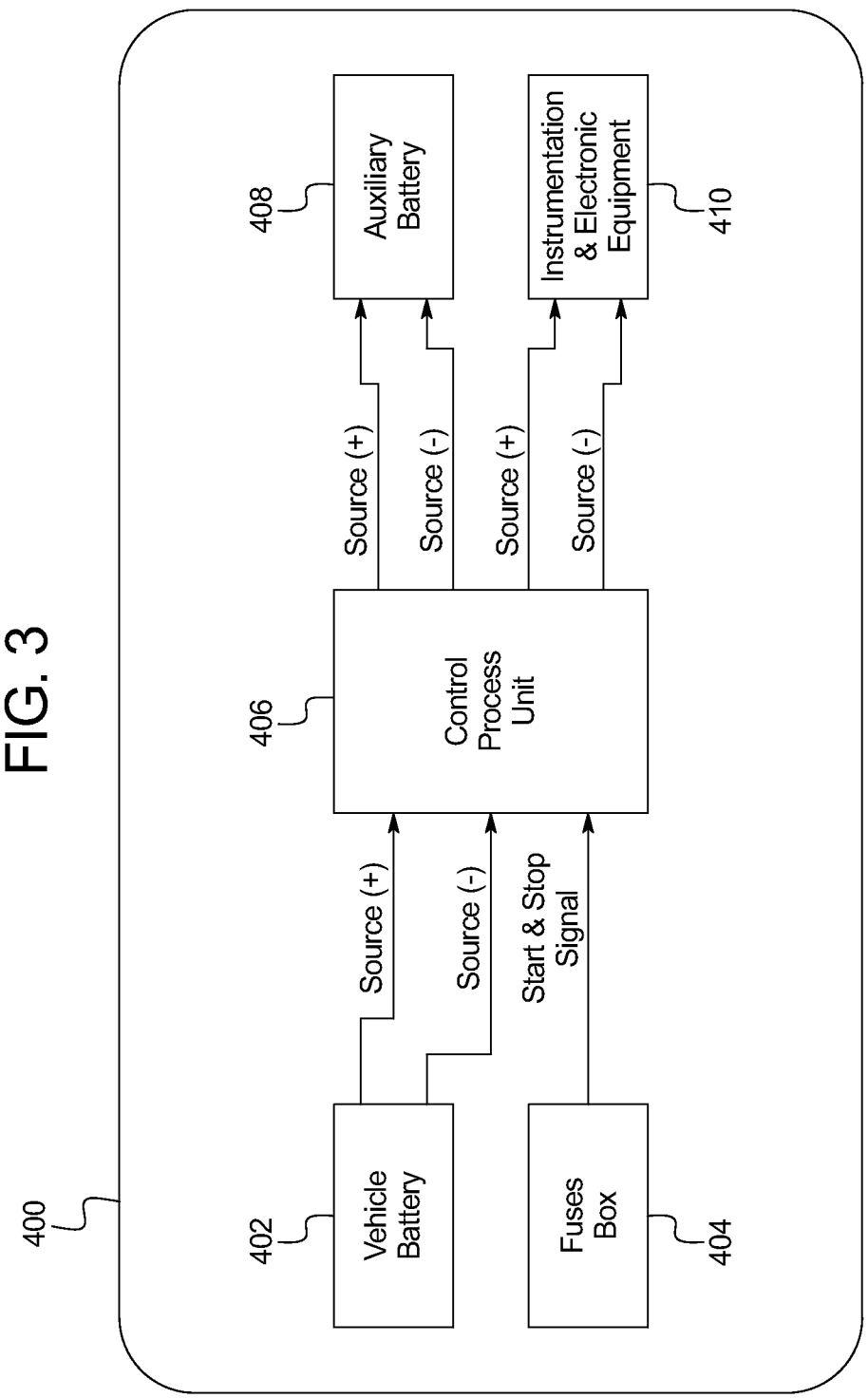
FIG. 3 is a block diagram of an example embodiment including components of vehicle with an auxiliary battery charging system of the present disclosure.
Figure 4:
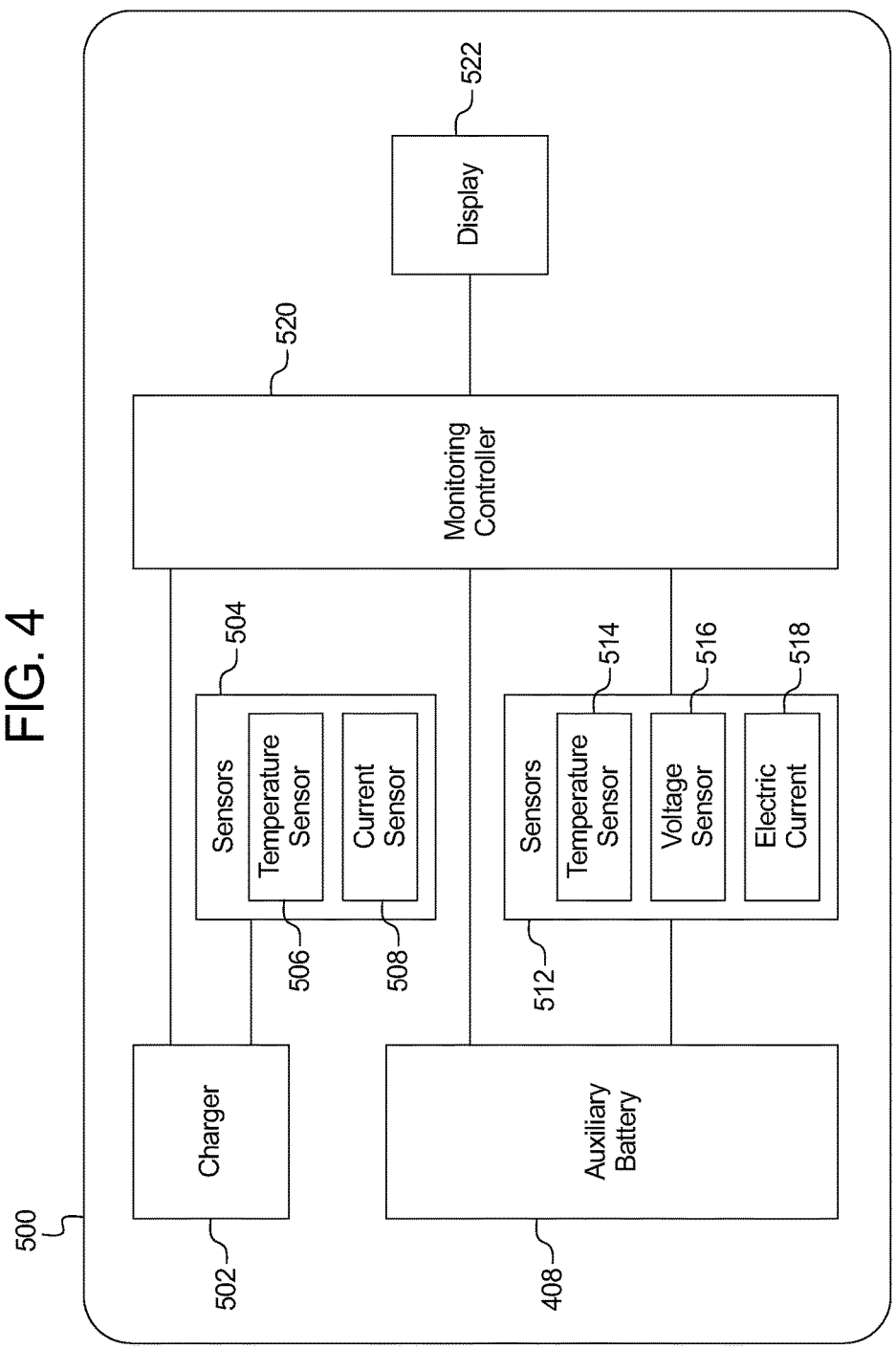
FIG. 4 is a block diagram of an example embodiment of an auxiliary battery charging system of the present disclosure.

Turning to FIG. 3, which depicts a block diagram of a vehicle 400 of the auxiliary battery charging system of the present disclosure. It should be appreciated that vehicle 400 includes a vehicle battery 402 for providing the main power to the main electrical systems. In addition to the vehicle battery 402, the vehicle 400 includes an auxiliary battery 408. The auxiliary battery 408 is provided in vehicles for energy to instruments and measurement devices 410 inside the vehicle.

The control process unit 406 is in communication with the auxiliary battery 408 and instrumentation and electronic equipment 410. The vehicle 400 also includes a fuse box 404 in communication with the vehicle control process unit 406. The fuse box 404 sends the start and stop signal for the auxiliary battery charging system to the control process unit.

FIG. 5 illustrates a block diagram of one embodiment of the auxiliary battery charging system of the present disclosure. In this embodiment, the auxiliary battery charging system 500 includes an auxiliary battery 408, an auxiliary battery charger 502, a monitoring controller 520, and a display 522.

The monitoring controller 520 may include any variety of electronic processing devices, memory devices, input/output devices, and other known components, and may perform various control and/or communication related functions. More specifically, the monitoring controller 520 is comprised of at least one processor in communication with a main memory that stores a set of instructions. The processor is configured to communicate with the main memory, access the set of instructions, and execute the set of instructions to cause the auxiliary battery charging system 500 to perform any of the methods, processes, and features described herein.

The processor may include any suitable processing device or set of processing devices such as, but not limited to: a microprocessor, a microcontroller-based platform, a suitable integrated circuit, or one or more application-specific integrated circuits (ASICs) configured to execute a set of instructions. The memory may be any suitable memory device such as, but not limited to: volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.); unalterable memory (e.g., EPROMs); and/or read-only memory.

In some embodiments, the set of instructions stored on the memory and that are executable to enable the functionality of the auxiliary battery charging system may be downloaded from an off-site server via an external network.

The monitoring controller 520 is further configured to communicate with an auxiliary battery charger 502 to initiate or disable charging of the auxiliary battery.

A plurality of sensors 504 and 512 provide charger 502 and battery 408, respectively, status information to the monitoring controller 520. In one embodiment, the plurality of sensors 504 for the charger 502 include a temperature sensor 506 for measuring the temperature of the charger and an electric current sensor 508 for measuring an electric current of the charger 502 when the charger is charging or discharging the battery. In this embodiment, the plurality of sensors 512 for the battery 408 include a temperature sensor 514 for measuring the temperature of the auxiliary battery, a voltage sensor 516 for measuring the output voltage of the battery, and an electric current sensor 518 for measuring an electric current of the battery when the battery is charging or discharging. The monitoring controller 520 also outputs battery status and charge/discharge information to be displayed on the display 522.

The sensors may include any combination of hardware and/or software components capable of monitoring charger and battery conditions. These sensors may be integrated within the charger 502 and battery 408, may be external to the charger 502 and battery 408, or may be provided according to some other known arrangement. Output from the sensors 504, 512 may be provided to the monitoring controller 520 or some other appropriate device.

The auxiliary battery charging system 500 further includes a display device 522 configured to display data about the auxiliary battery status such as, but not limited to, voltage, time since last charge and sleep function information. The display device 522 may be any suitable display device configured to display one or more virtual tags, such as but not limited to a liquid crystal display (LCD) or an organic light emitting diode (OLED). In one embodiment, the display device is an HMI. By providing this information to the user, the auxiliary battery charging system 500 enables the user to keep the battery functioning longer.

The display device includes a plurality of input devices to enable a user to provide an input to the auxiliary battery charging system. In various embodiments, the input devices may include, but are not limited to, a USB port, an auxiliary input, a microphone, and one or more buttons, one or more control knobs, an instrument panel, a keyboard, a scanner, a digital camera for image capture and/or visual command recognition, a touch screen, a mouse, or a touchpad. For example, in one embodiment, the input device includes buttons. The buttons may be any suitable buttons, such as but not limited to hard keys, soft keys, and virtual keys displayed on a display that are actuatable by a user to provide input to auxiliary battery charging system 500.

Any process descriptions or blocks in the figures, should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. An auxiliary battery charging system comprising a monitoring controller configured to:
    operate with a first plurality of sensors to perform a vehicle safety check using a vehicle state and an ambient temperature;
    if the vehicle is safe, operate with a charger to initiate charging of an auxiliary battery when the auxiliary battery voltage drops below a minimum voltage;
    stop the charging of the auxiliary battery when the auxiliary battery voltage reaches an optimum voltage; and
    disable the auxiliary battery charger after a defined period of time, wherein the defined period of time is modifiable by a user.

2. The auxiliary battery charging system of claim 1, further comprising a second plurality of sensors in communication with the monitoring controller.

3. The auxiliary battery charging system of claim 2, wherein the second plurality of sensors are further in communication with the auxiliary battery.

4. The auxiliary battery charging system of claim 2, wherein the second plurality of sensors are further in communication with the charger.

5. The auxiliary battery charging system of claim 1, wherein the monitoring controller is configured to receive a temperature reading of the auxiliary battery.

6. The auxiliary battery charging system of claim 5, wherein the monitoring controller is further configured to turn off the auxiliary battery charging system when the temperature reading of the auxiliary battery is outside of a normal range.

7. The auxiliary battery charging system of claim 1, wherein the optimum voltage is modifiable.

8. The auxiliary battery charging system of claim 1, wherein the minimum voltage is modifiable.

9. A method of charging an auxiliary battery comprising:
    receiving, at a monitoring controller, an auxiliary battery voltage, a vehicle state, and a vehicle ambient temperature;
    performing, with the monitoring controller, a vehicle safety check based on the vehicle state and the vehicle ambient temperature;
    if a vehicle is safe, initiating charging of the auxiliary battery, by a charger, when the auxiliary battery voltage drops below a predetermined minimum voltage;
    stopping the charging of the auxiliary battery when the auxiliary battery voltage reaches an optimum voltage; and
    disabling the auxiliary battery charger after a defined period of time, wherein the defined period of time is modifiable by a user.

10. The method of claim 9, further comprising a plurality of sensors in communication with the monitoring controller.

11. The method of claim 10, wherein the plurality of sensors are further in communication with the auxiliary battery.

12. The method of claim 10, wherein the plurality of sensors are further in communication with the charger.

13. The method of claim 9, wherein the monitoring controller is configured to receive a temperature reading of the auxiliary battery.

14. The method of claim 13, wherein the monitoring controller is further configured to turn off an auxiliary battery charging system when the temperature reading of the auxiliary battery is outside of a normal range.

15. The method of claim 9, wherein the optimum voltage is modifiable.

16. The method of claim 9, wherein the minimum voltage is modifiable.

17. The auxiliary battery charging system of claim 1, wherein the monitoring controller is further configured to perform the vehicle safety check by monitoring ambient temperatures of the auxiliary battery and the charger.

18. The auxiliary battery charging system of claim 17, wherein the monitoring controller is further configured to continuously monitor the ambient temperatures while the auxiliary battery is being charged by the charger.

19. The auxiliary battery charging system of claim 17, further comprising a display, wherein the monitoring controller is configured to display, via the display, the ambient temperatures, the auxiliary battery voltage, and an option to disable the auxiliary battery charger.

20. A vehicle comprising:
    a charger;
    an auxiliary battery;
    a processor to:
    operate with sensors to perform a vehicle safety check using a vehicle state and an ambient temperature,
    when the vehicle is safe and the auxiliary battery drops below a minimum voltage, cause the charger to charge the auxiliary battery until the auxiliary battery reaches an optimum voltage; and
    disable the auxiliary battery charger after a period of time, the period of time being user-modifiable.

* * * * *